United States Patent [19]

Wright et al.

[11] Patent Number: 5,615,222
[45] Date of Patent: Mar. 25, 1997

[54] ADPCM CODING AND DECODING TECHNIQUES FOR PERSONAL COMMUNICATION SYSTEMS

[75] Inventors: David A. Wright, Utica, N.Y.; Terrance R. Bourk, San Diego; Neal K. Riedel, Encinitas, both of Calif.

[73] Assignee: Pacific Communication Sciences, Inc., San Diego, Calif.

[21] Appl. No.: 191,609

[22] Filed: Feb. 4, 1994

[51] Int. Cl.$^6$ .................................. H04L 1/06; H04L 1/20
[52] U.S. Cl. .......................... 371/50.1; 455/135; 455/273
[58] Field of Search .................................. 371/37.1, 37.4, 371/38.1, 39.1, 50.1, 68.1, 68.2; 455/133, 135, 194.1, 52.1, 273

[56] References Cited

U.S. PATENT DOCUMENTS

| | | | |
|---|---|---|---|
| 4,020,461 | 4/1977 | Adams et al. | 371/37.1 |
| 4,398,224 | 8/1983 | Watanabe | 358/339 |
| 4,402,021 | 8/1983 | Sonoda et al. | 360/72.2 |
| 4,429,334 | 1/1984 | Hashimoto | 358/310 |
| 4,456,930 | 6/1984 | Hashimoto | 358/328 |
| 4,466,029 | 8/1984 | Tanaka | 360/72.2 |
| 4,549,227 | 10/1985 | Hashimoto et al. | 358/328 |
| 4,660,202 | 4/1987 | Woodsum | 371/50.1 |
| 4,682,332 | 7/1987 | Okamoto | 371/38 |
| 4,809,274 | 2/1989 | Walker et al. | 371/37.1 |
| 4,831,624 | 5/1989 | McLaughlin et al. | 371/37.1 |
| 4,882,732 | 11/1989 | Kaminaga | 371/2.2 |
| 4,914,527 | 4/1990 | Asai et al. | 360/10.3 |
| 5,309,443 | 5/1994 | Schorman | 371/5.5 |
| 5,392,300 | 2/1995 | Borth et al. | 371/37.7 |

OTHER PUBLICATIONS

McLaughlin, M., et al., "Speech and Channel Coding for Digital Land–Mobile Radio", *IEEE J. Selected Areas in Comm.*, vol. 6, No. 2, Feb. 1988.

Haykin, S., *Digital Communications*, pub. by John Wileg & Sons, 1988, pp. 210–217.

*Primary Examiner*—Stephen M. Baker
*Attorney, Agent, or Firm*—Merle W. Richman, III; Martin J. Jaquez

[57] ABSTRACT

The present invention provides a system and methods for coding and decoding digital data to improve the subjective quality of a voice signal. According to the invention, a sampled voice waveform is compressed by an ADPCM algorithm resulting in a sequence of samples. The sequence of samples are formed into an array and coded into parity bits. Row and column checksums are preferably performed on the parity bits to form row and column vectors. The samples and row and column vectors are transmitted to a receiving unit preferably having a diversity capability. The receiver processes each diversity block by generating row and column vectors from the received samples and comparing the generated row and column vectors to the row and column vectors received. Then based on the comparison, the samples of the best diversity block are used to reconstruct the voice waveform on a sample-by-sample basis.

26 Claims, 11 Drawing Sheets

ADPCM CODING AND DECODING TECHNIQUES FOR PERSONAL COMMUNICATION SYSTEMS

FIELD OF THE INVENTION

The present invention relates generally to methods for improving the subjective quality of digitally processed signals. More particularly the invention relates to methods of improving the subjective quality of voice signals transmitted over a wireless telephone system having a diversity capability and in which adaptive differential pulse code modulation (ADPCM) is used.

BACKGROUND OF THE INVENTION

In personal communication systems (PCS), such as the Personal Handy Phone (PHP) system in use in Japan, voice data is often processed by a "voice-band" process (typically 300 to 3300 Hz, as, for example, the human voice) using an Adaptive Differential Pulse Code Modulation (ADPCM) technique. ADPCM is widely utilized in telephony and is usually implemented in accordance with well known standards such as the Consultative Committee in International Telegraphy and Telephony (CCITT) Standard G.721. In general, sampled voice data is passed through an ADPCM algorithm wherein the digital voice data is compressed. The data output from the ADPCM algorithm is known as a sample, or more generally, as an ADPCM sample. According to the CCITT Standard G.721, a byte of digital voice data is compressed into a 4-bit sample. Although, the present invention will be described by way of example in which samples are defined as having 4-bits, it should be understood that the invention should not be limited by the example. More particularly, the invention should not be limited to personal communication systems in which ADPCM is employed. The invention is directed to any digital communication system in which digital data may be arranged in groups having any predetermined number of bits. These groups will be generally referred to as samples.

In existing communications systems the samples are organized in blocks of data with various overhead and control bits, which are transmitted together contiguously in time. Among the overhead bits transmitted in the block are a sequence of redundant bits which may be used for error deletion and/or correction. These bits are known as "parity" bits and are typically derived from the samples and other overhead data which form the block of data. CRC-16 is one well known standard used to generate these parity bits.

Figure 1:
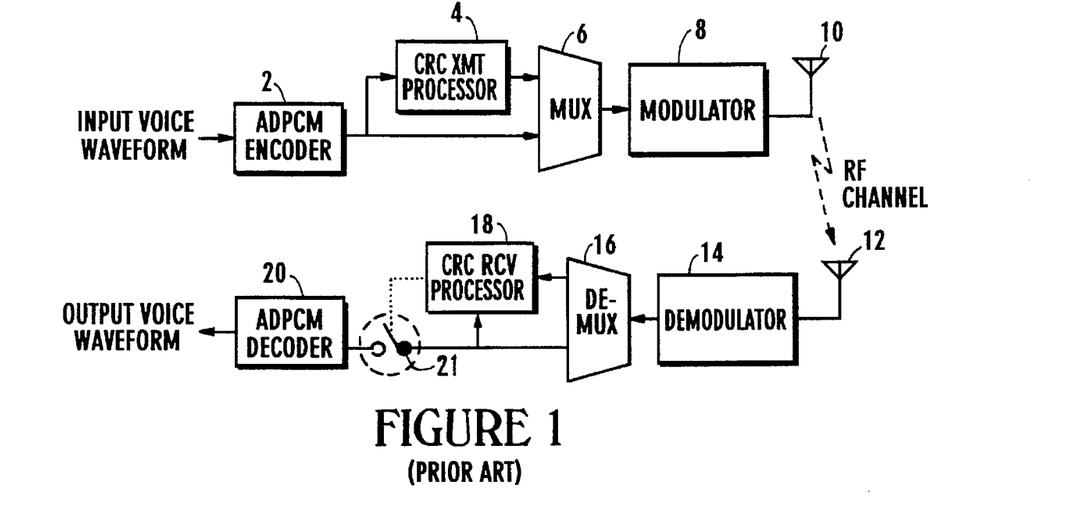
FIG. 1 shows a block diagram of a typical personnel communications system using ADPCM.

Typically, parity bits are used simply for error detection. For example, a block diagram of a typical PCS using ADPCM is shown in FIG. 1. Digitized voice data is provided as an input to the ADPCM encoder 2. The ADPCM encoder 2 compresses the digitized voice data into a block of ADPCM samples which are output to the CRC transmit processor 4 and a multiplexer 6. The CRC transmit processor 4 processes the ADPCM samples to form the parity bits. The multiplexer 6 then outputs the block of ADPCM samples and the corresponding parity bits to the modulator 8, which modulates and up converts the data for transmission via RF transmitter 10.

On the receiving end, an RF antenna 12 receives the transmitted block of data and outputs it to the demodulator 14. The demodulator 14 down converts and demodulates the received data. The down-converted data is then output to the demultiplexer 16 which outputs the down-converted data to the CRC receive processor 18 and selectively outputs the down-converted data representing the block of ADPCM samples to the ADPCM decoder 20. The ADPCM decoder 20 then processes the ADPCM sample to recover the digitized voice waveform.

With simple error detection, the presence of errors in a received block of data is determined by forming a syndrome at the receiver, i.e. generating parity bits from the received block of data and then comparing the received parity bits with those generated from the received block of data. When the syndrome is zero (i.e., the parity bits generated are the same as the parity bits received), the slot contents are assumed to be error free and the samples are processed to recover the digitized voice data. When the syndrome is non-zero (i.e., at least some of the parity bits generated by the CRC receive processor 18 differ from the parity bits received), the received block of data is discarded and the ADPCM decoder output is muted by opening switch 21 for a period of time equivalent to the duration of the transmission. This process is graphically shown in FIG. 2.

Figure 2:
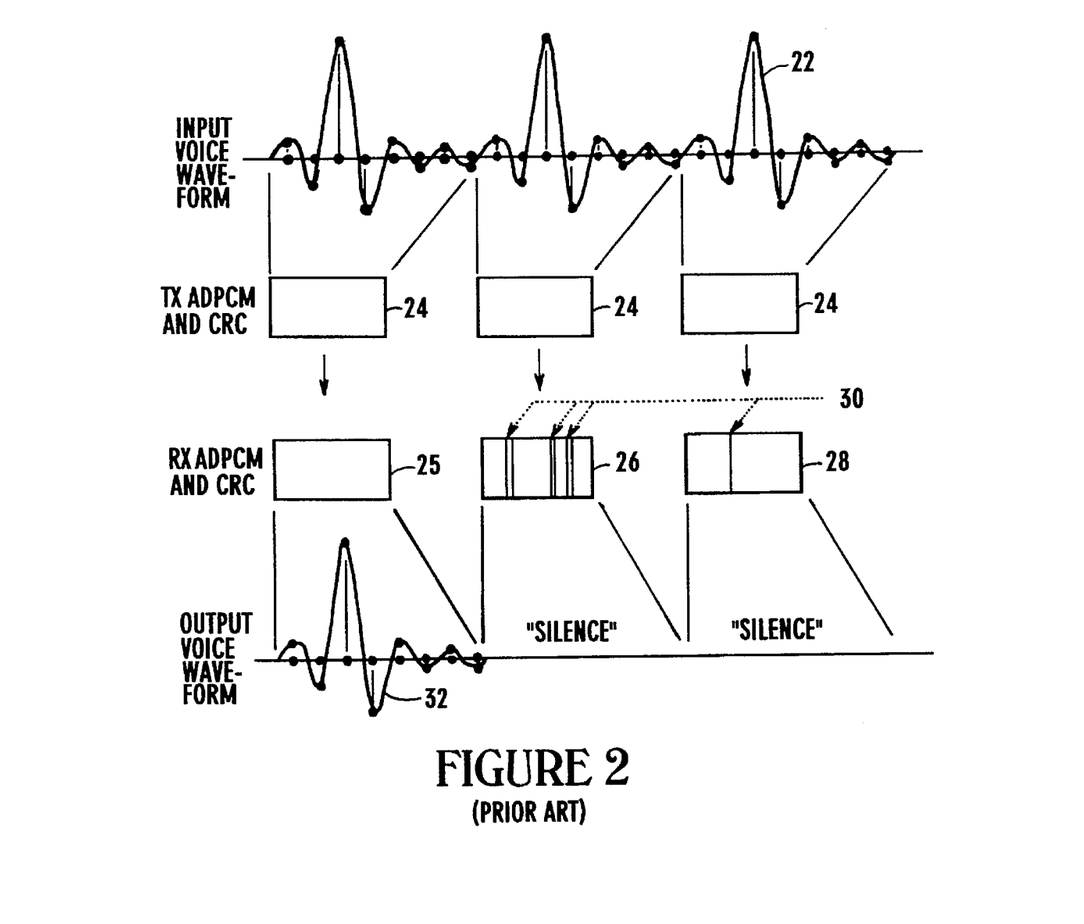
FIG. 2 shows a graphical representation of the waveform processing using a CRC error detection technique.

In particular, FIG. 2 shows the sampled voice waveform 22 which is processed into a block of ADPCM samples and parity bits collectively referred to as transmission blocks 24. The transmission blocks 24 are transmitted and received by a PCS receiving unit. Errors 30 may be detected in some of the received blocks such as blocks 26 and 28 shown in FIG. 2. Therefore, only block 25 in which no errors are detected is processed by the ADPCM decoder.

Due to interference and fading effects on the radio channel, a fraction of the slots experience transmission errors, so the simple error detection method results in gaps which cause break-up of the received speech as shown by the output voice waveform 32 in FIG. 2. If the parity bits were merely ignored and all of the received data was processed the reconstructed voice waveform would contain frequent "pops" and "clicks" and other objectional artifacts due to the processing of samples containing bit errors.

Figure 3:
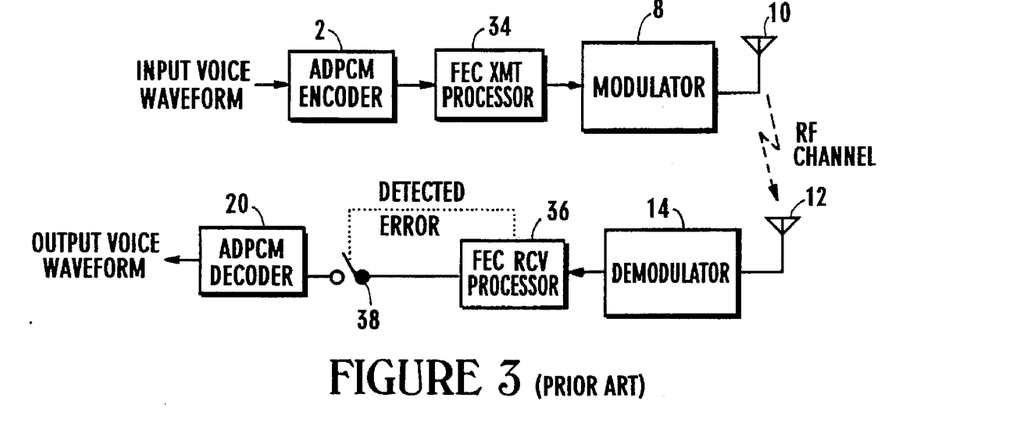
FIG. 3 shows a block diagram of a personal communications system using ADPCM and FEC coding.
Figure 4:
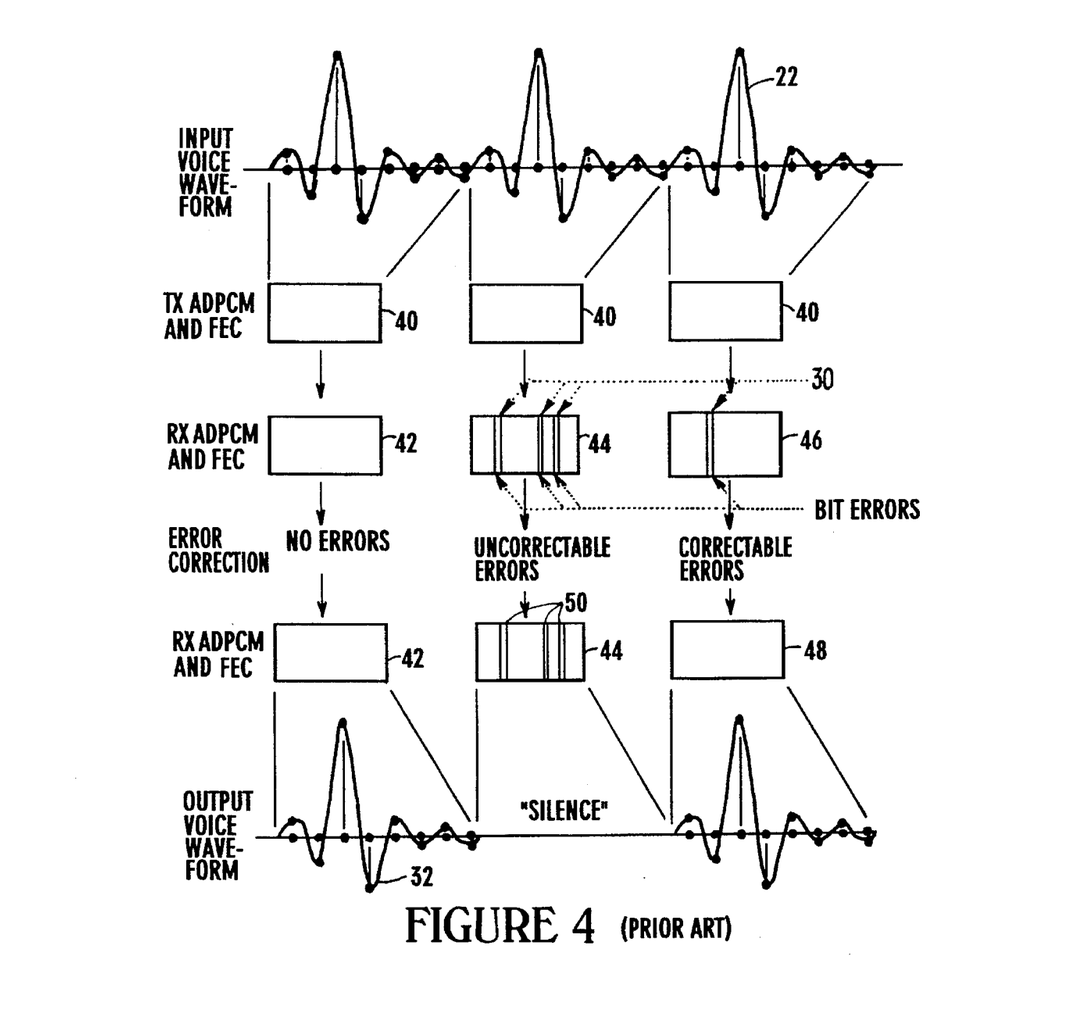
FIG. 4 shows a graphical representation of the waveform processing using FEC coding.

In an effort to mitigate this degradation, forward error correction (FEC) or other advanced signal processing concepts could be used to potentially improve the quality of the received voice band signals during periods of fading and interference. For example, a block diagram of a personal communications system using ADPCM and FEC coding is shown in FIG. 3 and a graphical representation of the waveform processing using the FEC coding is shown in FIG. 4. The ADPCM encoder 2 and decoder 20, modulator 8, transmitter 10, antenna 12, and demodulator 14 perform the same functions as described above in connection with FIG. 1. The CRC processors 4 and 18 are replaced by the FEC processors 34 and 36 respectively. The need for the multiplexer 6 and demultiplexer 16 may be eliminated when using FEC coding because either the entire data block is coded so that parity bits are not required or the FEC processors internally multiplex and demultiplex the data with error correction bits as appropriate. FEC coding not only provides the capability of detecting errors, but also provides a limited capability for correcting some of the detected errors. When an error is detected and can not be corrected by the FEC receive processor 36, switch 38 is opened to prevent the samples received in the active block to be processed by the ADPCM decoder 20.

FIG. 4 is a graphical depiction of voice waveform processing using an FEC coding technique. As shown in FIG. 4, the sampled voice waveform 22 is processed into transmission blocks 40 to which FEC coding has been applied to the samples to be transmitted. The FEC receive processor may detect errors 30 in some of the received blocks, for example blocks 44 and 46. When no errors are detected in a received block, such as block 42, that block is output to the ADPCM decoder and the output voice waveform 32 corresponding to that block can be reconstructed. However, when errors are detected, the FEC receive processor may be capable of correcting some of the detected errors as is well known. Block 46, for example, is shown to contain only correctable errors such that those errors are corrected to produce a substantially error-free block 48. Thus, once detected errors have been corrected, block 48 can be processed to reconstruct the voice waveform 32. Where the detected errors cannot be corrected by the FEC receive processor, as in the case of block 44, that block of data is then muted to produce a period of silence for the duration of the transmitted block as shown in FIG. 4.

Although FEC techniques may result in a reduction of the number of muted blocks of voice data, blocks of data containing uncorrectable errors still produce periods of silence in the reconstructed voice waveform. Moreover, undetected errors still may produce objectionable distortion when the data having errors is processed.

To combat fading and interference some personal communication systems may employ two or more antennas. Each antenna would receive a different standing wave pattern of the transmitted data. The PCS receiver attempts to select the antenna with the stronger signal path. This technique is generally referred to as space diversity.

Figure 5:
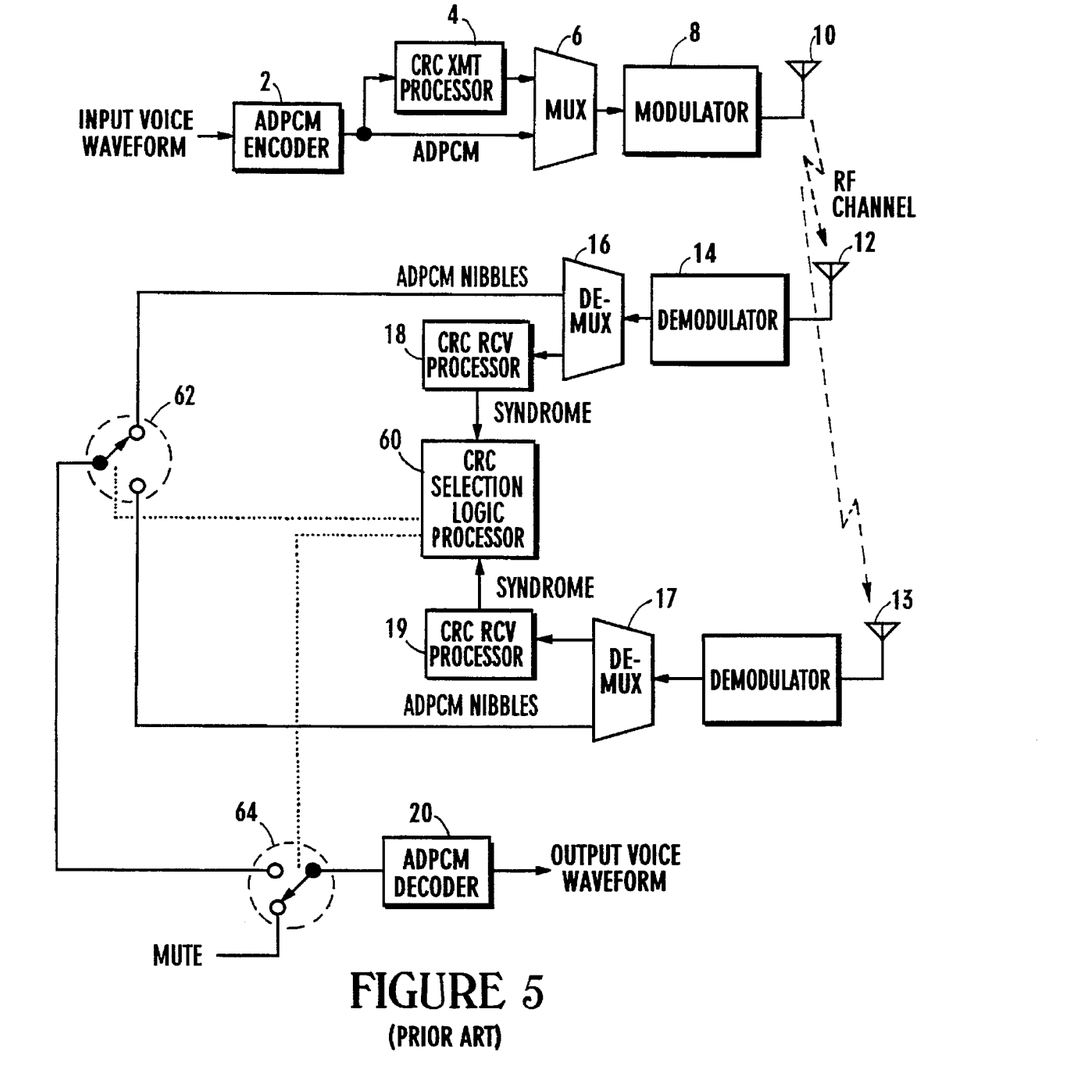
FIG. 5 shows a block diagram of a personal communication system employing space diversity.

A block diagram of a PCS employing space diversity is shown in FIG. 5. For exemplary purposes, the system shown in FIG. 5 uses CRC processing. However, it should be understood that FEC coding could also be used in a diversity system. The functions performed by the ADPCM encoder 2, CRC transmit processor 4, multiplexer 6, modulator 8, and transmitter 10 are substantially the same as described above in connection with FIG. 1. In the diversity system shown in FIG. 5, two antennas 12 and 13 each receive the transmitted blocks. Demodulators 14 and 15 down-convert and demodulate the received blocks of data. The demodulated data from each receive chain (i.e., antenna 12 and demodulator 14 represent one receive chain and antenna 13 and demodulator 15 represent a second receive chain), is output to the respective CRC receive processors 18 and 19. As described above, the CRC receive processors 18 and 19 generate a new set of parity bits derived from the ADPCM samples received and then create a syndrome by comparing the generated parity bits with the received parity bits. These syndromes which will be referred to as diversity syndromes are output from the respective CRC processors 18 and 19 to the CRC selection logic processor 60. The CRC selection logic processor 60 operatively controls switches 62 and 64 based on the syndromes so that the ADPCM samples from one of the demultiplexers 16 or 18 is processed by the ADPCM decoder 20 or muted to produce the periods of silence shown in FIG. 2.

Figure 6:
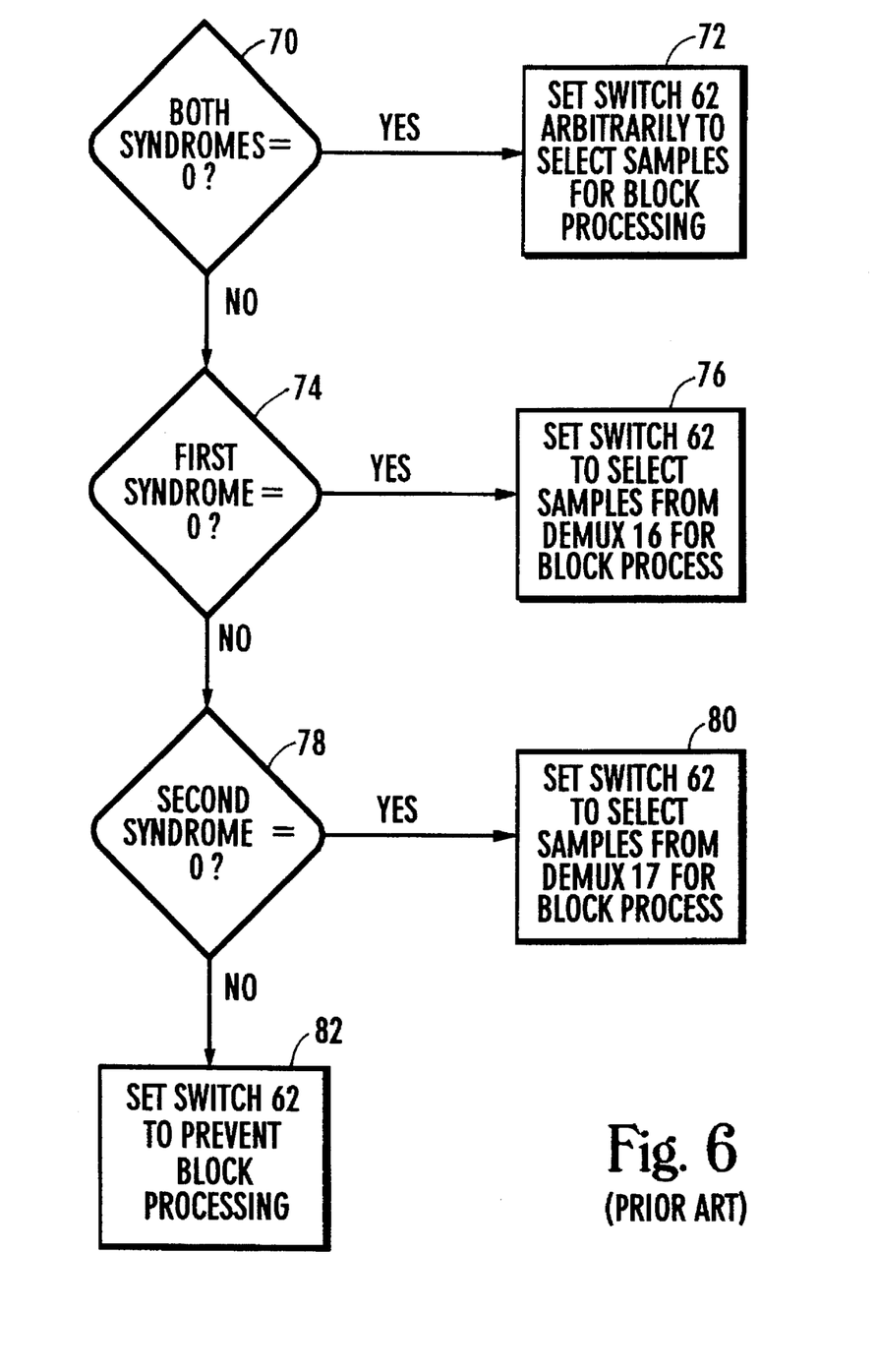
FIG. 6 shows a flow diagram representing the processing steps performed by the CRC selection logic processor.

FIG. 6 is a flow diagram representing the processing steps performed by the CRC selection logic processor 60. The CRC selection logic processor checks the diversity syndromes to determine whether any errors were detected in the block of data received by each of the receive chains by determining whether the diversity syndromes are zero as shown at step 70. If both syndromes are zero, then the CRC selection logic processor sets switch 62 to allow the ADPCM samples from either demultiplexer to be output to the ADPCM decoder at step 72. If the first syndrome (i.e., corresponding to the block of data received by antenna 12, demodulator 14, and demultiplexer 16) is zero and the second syndrome (i.e., corresponding to the block of data received by antenna 13, demodulator 15, and demultiplexer 17) is non-zero as determined at step 74, the CRC selection logic processor sets the switch 62 so that the ADPCM samples from demultiplexer 16 are output to the ADPCM decoder at step 76. If the CRC selection logic processor determines at step 78 that the second syndrome is zero and the first syndrome is non-zero, then switch 62 is set to permit the ADPCM samples from demultiplexer 17 to be output to the ADPCM processor. When both syndromes are non-zero, the CRC selection logic processor sets switch 64 so that any samples output from either demultiplexer are muted in that they are not processed by the ADPCM decoder thereby creating a period of silence for the duration of that block.

It should be understood that by adding additional diversity channels to the personal communication system receiver, the number of periods of silence may be reduced. However, such diversity does not eliminate these lengthy periods of silence which significantly degrade the subjective quality of the reconstructed voice waveform. Moreover, undetected errors still create undesirable "pops" and "clicks" in the reconstructed voice waveform since all of the samples in a block of data are processed when no errors are detected.

Therefore, there is a need to provide coding and decoding techniques capable of improving the subjective quality of the reconstructed voice waveform in a wireless communication system while still eliminating the so-called "pops" and "click" resulting from the processing of data that contains errors.

SUMMARY OF THE INVENTION

The present invention fulfills these needs by providing a method of coding digital data comprising the steps of: grouping a sequence of samples to form a block of data; arranging the samples of the block into a number of rows and a number of columns to form a block array; reducing each sample into a parity bit set; processing the parity bit sets of each row and of each column of the block array to form a respective row vector and a respective column vector; combining them to form a parity vector; and combining the sequence of samples with the parity vector to form a transmission block. In a preferred embodiment, the digital data is voice data which is compressed by an adaptive differential pulse modulation (ADPCM) algorithm resulting in the sequence of samples. In a more preferred embodiment, the step of reducing each sample into a parity bit set comprises: dividing each sample into groups of two bits and defining a single parity bit for each of the two-bit groups in the sample. The step of processing the parity bit sets preferably includes performing a checksum on the parity bit sets in each row and column of the block array so that the parity vector comprises a sequence of checksum values associated with one row or column of the block array. Still further, the transmission block is sent to a receiving unit capable of processing the sequence of samples to locate any sample received with at least one bit error. The transmission block is also preferably sent to a receiving unit being operable to provide diversity.

The present invention also provides a method of improving the quality of a digital data transmission, comprising the steps of: coding a block of data representing the digital data to be transmitted to form coded data; generating a first parity vector based upon the coded data; transmitting the block of data in combination with the first parity vector associated therewith; receiving the block of data and associated first parity vector; coding the block of data so received to form received coded data; generating a second parity vector based upon the received coded data; comparing the first and second parity vectors to determine whether the block of data so received contains bit errors: and processing the block of data with the exception of the data determined to contain bit errors to recover the digital data. The steps of coding the block of data transmitted and received preferably comprise the steps of: dividing the block of data to be transmitted and the block of data so received into groups of data; arranging the groups of data into an array having a number of rows and a number of columns to form a respective transmission array and a respective reception array, each array having the same number of rows and the same number of columns; and coding each group of data according to a predetermined coding scheme. The steps of generating the parity vectors comprise the steps of: performing a checksum on the groups of data in each of the rows and in each of the columns resulting in a checksum value associated with each row and each column; and combining all of the checksum values to form the parity vector. Preferably the method also comprises a step for identifying those groups of data containing at least one bit error within a block of received data when the block of data received is determined to contain at least one bit error.

In a preferred embodiment, digital data is received by a receiving unit operable to provide diversity so that each transmitted block of data is received in a plurality of diversity blocks. According to the invention, the preferred method further comprises the following steps: generating a plurality of second parity vectors based on the block of data received in each of the plurality of diversity blocks; comparing each new parity vector with the associated first parity vector to determine whether the block of data received in each respective diversity block contains bit errors and forming a syndrome based upon the comparison; identifying a diversity block, if any, in which no bit errors were detected and then decoding the block of data associated with the diversity block, selecting a preferred diversity block for each transmission in which all of the plurality of diversity blocks received for a transmitted block of data are determined to contain bit errors; and processing the received block of data associated with the preferred diversity block.

In a more preferred embodiment each block of data transmitted comprises a plurality of samples and the samples are arranged in a number of rows and a number of columns. The parity vector preferably comprises one checksum value related to each of the rows and columns. In a more preferable embodiment the method further comprises the steps of: comparing the samples received in each of the diversity blocks on a sample-by-sample basis to determine whether each samples received in at least one of the plurality of diversity blocks is the same as the samples received in the remaining diversity blocks and defining those samples as good samples and, when the samples received in at least one of the plurality of diversity slots differs from the samples received in the remaining diversity blocks, defining those samples as error samples; processing the good samples received in any of the plurality of diversity blocks; checking the syndrome of the preferred diversity block to determine whether bit errors were detected in the row and column associated with each error sample; and processing only those error samples for which either the associated row or column checksum value indicates that the respective row or column is error free.

A system for detecting and locating data errors in digital data transmitted using a wireless communications system is also provided by the present invention. The digital data is grouped into a sequence of samples and a number of samples are transmitted as a block. The system according to the invention comprises: a receiving means having a diversity capability for receiving the transmitted samples such that each block of samples are received in a plurality of diversity blocks; and a processing means coupled to the receiving means for detecting and locating on a sample-by-sample basis any sample containing a data error.

BRIEF DESCRIPTION OF THE DRAWINGS

The present invention will be better understood, and its numerous objects and advantages will become apparent by reference to the following detailed description of the invention when taken in conjunction with the following drawings in which.

DETAILED DESCRIPTION OF THE INVENTION

Figure 7:
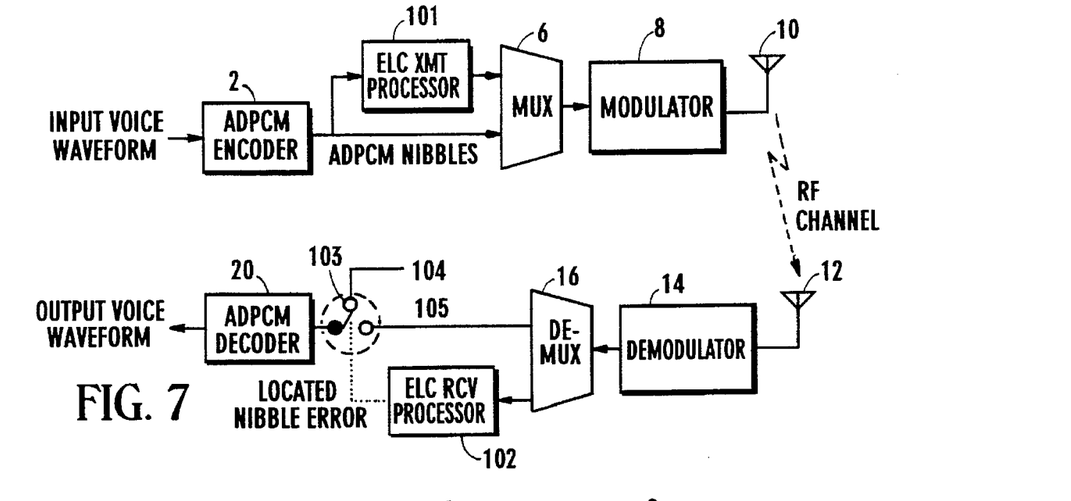
FIG. 7 shows a system block diagram of a personal communications system employing error location coding (ELC) according to the present invention.

A system block diagram of the present invention is shown in FIG. 7. The ADPCM encoder 2, modulator 8, multiplexer 6, transmitter 10, antenna 12, demodulator 14, demultiplexer 16, and ADPCM decoder 20, operate as described above in connection with FIGS. 1 and 3. However, the error location coding (ELC) transmit processor 101 and ELC receive processor 102 replace the CRC transmit and receive processors 4 and 18 in FIG. 1 and the FEC transmit and receive processors 34 and 36 in FIG. 3, respectively. According to the invention, the ELC transmit processor 101 codes the block of samples to be transmitted and generates a parity bit set from the coded data. The parity bit set is then transmitted with the block of samples. The ELC receive processor 102 codes the received block of data in the same manner as the ELC transmit processor 101 and then similarly generates a new parity bit set. The ELC receive processor 102 then compares the received parity bit set with the new parity bit set to determine if the received samples contain errors. For instance, the received parity bit set may be Exclusive-Ored with the new parity bit set to form a syndrome.

The ELC receive processor 102 evaluates the syndrome to determine whether any errors have been detected. If no errors have been detected in the received block of samples, the ELC receive processor 102 outputs a signal causing switch 103 to interface the output of demultiplexer 16 with the ADPCM decoder 20 to permit the received samples to be output from the demultiplexer 16 to the ADPCM decoder 20. If the ELC receive processor 102 detects errors in the received block of samples, the ELC receive processor 102 locates the individual samples which may contain the detected errors. The ELC receive processor 102 provides an output signal which causes switch 103 to toggle between the mute position 104 and the data position 105 to selectively permit only those samples which have no detectable errors to be processed by the ADPCM decoder 20. Details of the ELC processing are described below.

Figure 8:
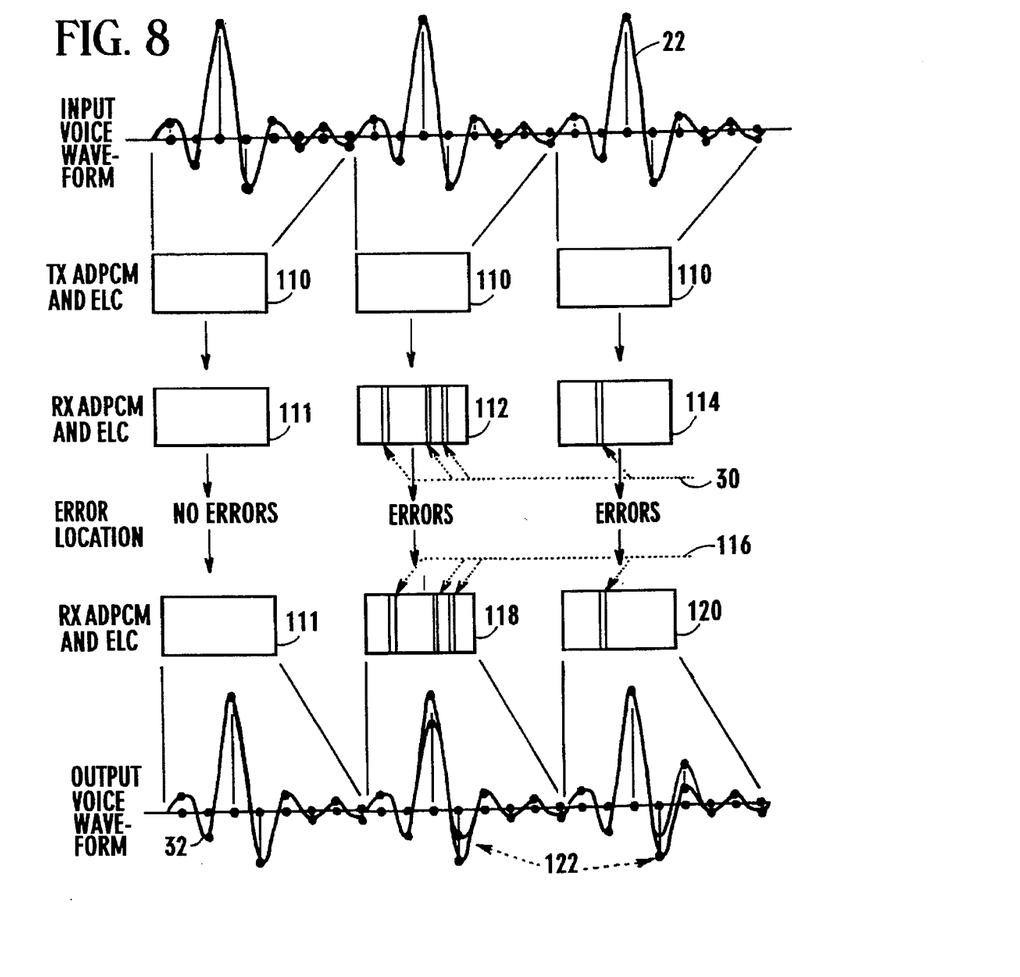
FIG. 8 shows a graphical representation of the ELC waveform process according to the present invention.

The ELC overall process described above is shown graphically in FIG. 8. The sampled voice waveform 22 is processed into transmission blocks 110 comprising a block of samples and a set of parity bits generated by the ELC transmit processor. The parity bits generated by the ELC transmit process are referred to hereinafter as a parity vector. The ELC receive processor evaluates the received blocks 111, 112, and 114. In FIG. 8, only block 111 is determined to be substantially error-free and, therefore, all of the samples in that block are processed by the ADPCM decoder to reconstruct the input voice waveform shown. The resulting reconstruction is the output voice waveform 32. In the example shown in FIG. 8, blocks 112 and 114 contain detectable errors 30. The ELC receive processor locates the samples 116 containing errors and prevents those samples from being processed by the ADPCM decoder.

The resulting output waveform, therefore, does not include periods of silence. Instead an output voice waveform 32 is continuously generated despite errors detected in the received blocks. Some distortion 122 is caused in the output voice waveform 32 by muting the samples containing detected errors. In terms of the waveform's subjective quality as perceived, for example by a listener, it is far more preferable to hear some distortion than to hear relatively long periods of silence. Moreover substantially none of the error free samples in a block of sample are muted merely because the block of samples contains one or more bit errors as is the case with the coding techniques described in connection with FIGS. 1 and 3.

Figure 9:
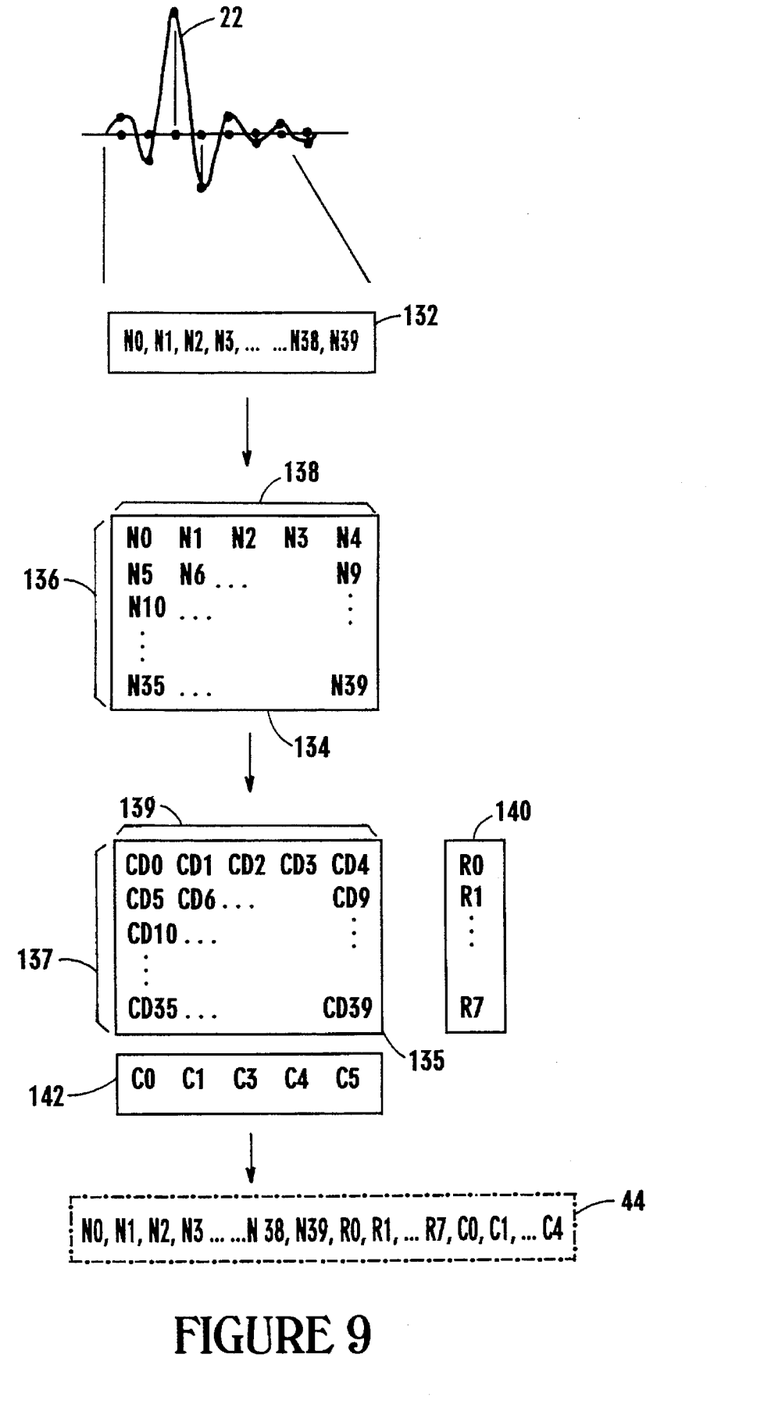
FIG. 9 shows a functional flow diagram of a preferred coding process according to the invention.

A detailed description of the ELC coding process will now be described with reference to FIG. 9 which graphically depicts a preferred coding process according to the invention. In the example shown in FIG. 9, the sampled voice data is first compressed according to the CCITT standard G.721 so that the data to be transmitted is in the form of ADPCM samples wherein each sample contains 4 bits of data.

First a segment of the sampled voice waveform is encoded according to the ADPCM algorithm. The output of the algorithm is grouped into blocks of samples 132. In the embodiment shown for purposes of example, each block contains 40 samples designated N0, N1, . . . N39. According to the ELC coding process of the invention, the samples in each block are arranged in an array 134 having a number of columns 138 and a number of rows 136. For instance, in the example shown in FIG. 9, the 40 samples have been arranged in 8 rows 136 and 5 columns 138 to form array 134.

Each of the samples is then preferably coded to form coded data or preferably a parity bit set. In this example one parity bit is chosen for each half of each sample to make the overall parity even. For example, a sample containing the following bits "1011" would be reduced to a parity digit "10". The first half of the sample "10" includes only an odd number of 1 bits, thus another "1" must be added to make the parity even. The second half of the sample "11" includes an even number of "1" bits so that adding a "0" bit will maintain the even parity. Thus the sample "1011" is coded into the dibit "10". Each sample is then similarly coded to form a new array 135 of coded data with the dibits (CD0, CD1, . . . CD39) replacing the corresponding samples (N0, N1, . . . N39) of the array 134.

For each row 137 and column 139 new array 135 a checksum may then preferably be preformed to combine the entries of coded data of each row 137 and column 139 to form respective row and column vectors 140 and 142. In a preferred embodiment, the parity dibits (CD0, CD1, . . .) are combined using an exclusive-or operation to generate a respective row vector of dibits 140 and a respective column vector of dibits 142. It should be understood that the coded data may be combined using other logical operations to form respective row and column vectors. The samples (N0, N1, . . .) and corresponding row and column vectors may then be formed into a transmission block 144. Preferably, the block of samples 132 is appended with the row and column vectors 140 and 142 to create the transmit block 144.

Figure 10:
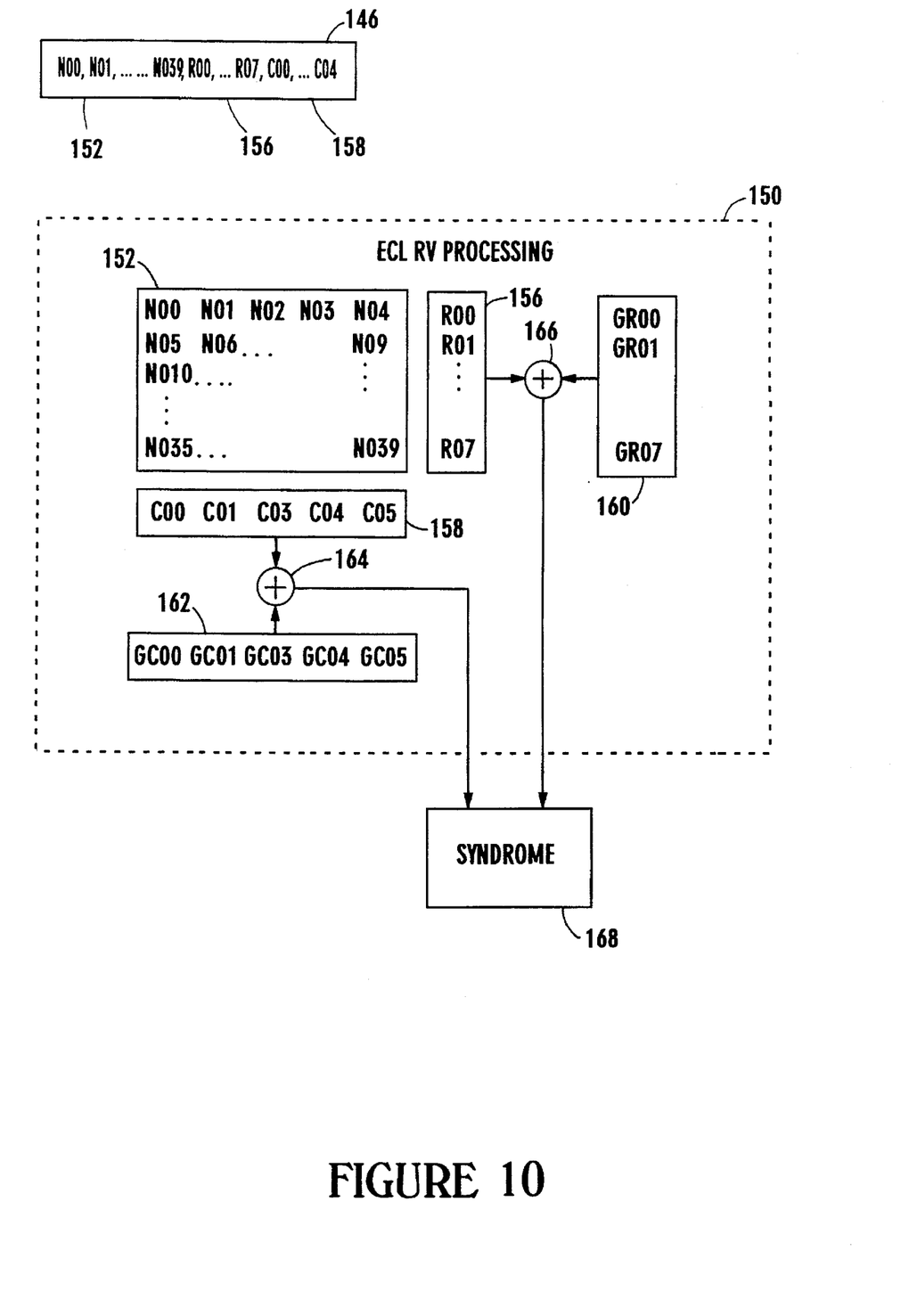
FIG. 10 shows a functional flow diagram of the ELC decoding process according to the present invention.

FIG. 10 is a functional flow diagram of the ELC decoding process. Using the same parameters described above in connection with description of the ELC coding process, the received block 146 contains 40 samples and corresponding row and column vectors generated during the coding process. It should be understood that the received samples and vectors may differ from the samples and vectors transmitted due to interference and fading which can cause bit errors in the received sample as described above.

The samples received in block 146 are preferably arranged in an array 152 having the same number of rows and columns used during the coding process. Therefore, in the present example, array 152 is shown to have 8 rows and 5 columns. The decoding process generates row and column vectors 160 and 162 by coding the array of received samples 152 in substantially the same way as described above in connection with the ELC coding process and then combines each entry in the array of coded data (not shown in FIG. 10) to form the row and column vectors 160 and 162 as described hereinabove.

The received row vector 156 may then be compared to the generated row vector 160 by providing each entry preferably a checksum value in the respective vectors to a comparison means 166. For instance, comparison means 166 may preferably be implemented as an exclusive-or operator. Thus the first entry R0 in the received row vector 156 and the first entry GR0 in the generated row vector 160 are provided as inputs to the exclusive-or operator 166. Similarly, the generated column vector 162 is compared to the received column vector 158 by comparison means 164. The output of the comparison means 164 and 166 are used to form syndrome 168. in this example where the comparison means are exclusive-or operators, the syndrome would contain a "0" bit for each of the generated row and column entries that matched the corresponding received row and column entries, (i.e., when R0=GR0 and C0=GC0). The syndrome would contain a "1" for each of the generated row or column entries that differ from the corresponding entry in the received row and column vector. It is also preferable to maintain a count of all of the row and column entries of checksums which fail, i.e., the corresponding row and column checksum values differ.

Whenever the entries do not match, i.e, the syndrome preferably contains a "1" for a particular row or column entry, the ELC receive processor determines that the received block 146 contains an error. Moreover, the ELC receive processor may permit each received sample to be processed by the ADPCM decoder to reconstruct the voice waveform, while causing any sample with errors to be muted. In this way each receive block that is determined to contain errors may be processed with the exception of those samples which may contain errors. It should further be understood that a sample may be muted only if both of its corresponding column and row entries indicate that an error exists. Alternatively, a sample may be muted if either its corresponding row entry or corresponding column entry indicate that an error exists.

Figure 11:
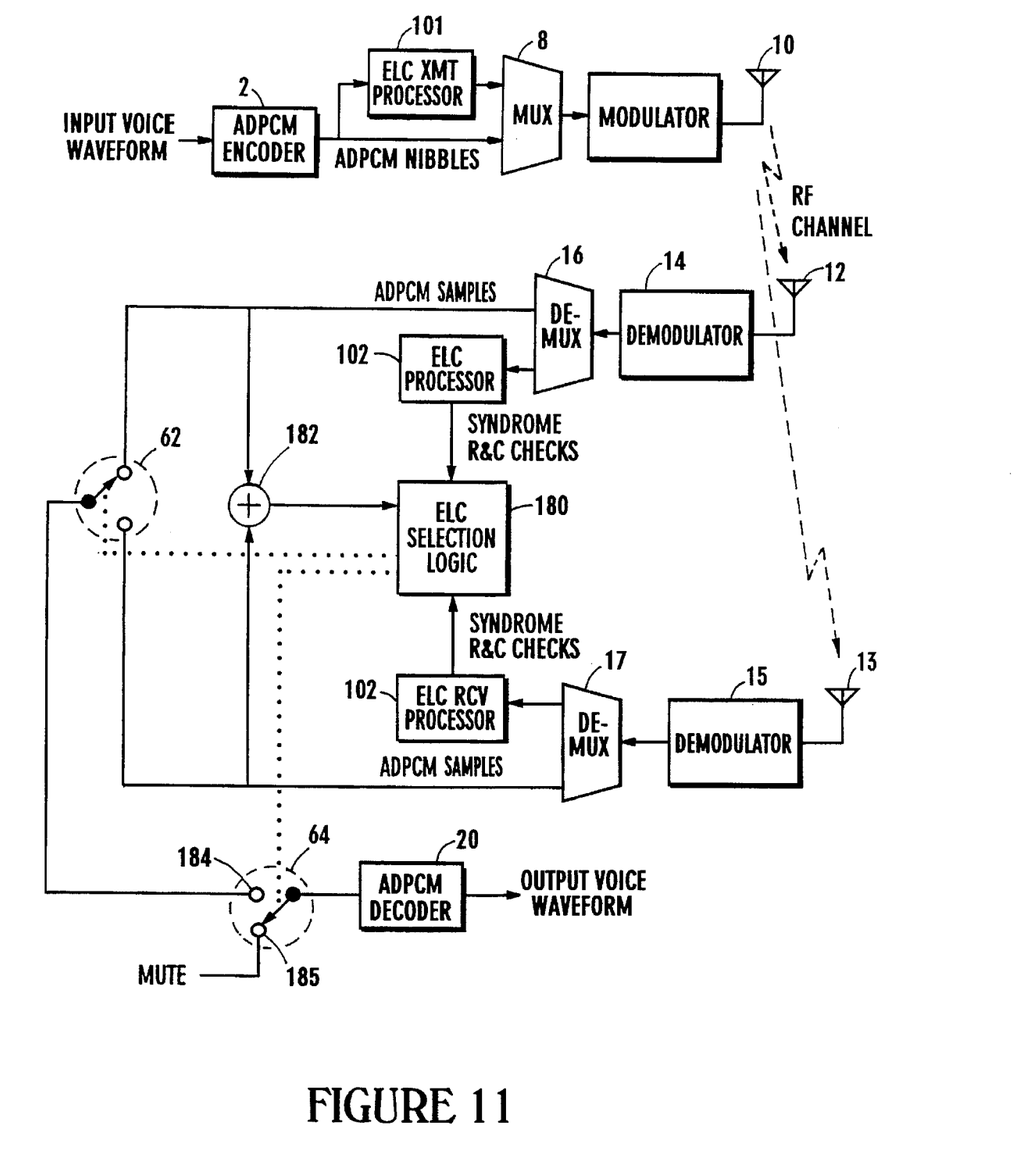
FIG. 11 shows a block diagram of a communication system employing space diversity in which ELC processing according to the present invention is used.

A block diagram of a preferred embodiment of the invention is shown in FIG. 11 in which the PCS provides space diversity. The functions of each of the blocks shown are substantially the same as those described in connection with FIG. 5 with the exception of the ELC transmit processor 101, ELC receive processors 102, and the ELC selection logic processor 180 which replace the CRC transmit processor 4, CRC receive processors 18 and 19, and the CRC selection logic processor 60, in FIG. 5, respectively. The operation of ELC transmit processor 101 and ELC receive processors 102 has also been described above in connection with FIG. 7. Therefore, the following description focusses on the operation of the ELC selection logic processor 180.

According to the preferred embodiment shown in FIG. 11, the ELC selection logic processor 180 receives an input of data indicating the number of the row and column checksum failures determined by the ELC receive processors 102 and an input of the syndromes generated by the ELC receive processors 102. The ADPCM samples are also output to a second comparison means 182, which may comprise for example, am exclusive-or operator. The comparison means 182, combines the ADPCM sample into a sample comparison array which is described below. The sample comparison array may then be provided as an input to the ELC selection logic processor 180. The ELC selection logic processor 180 uses these inputs to select either an output of samples from demultiplexer 16 or from demultiplexer 17 to be processed by the ADPCM decoder 20, or it causes the output of both demultiplexers to be muted so that a sample having error is not processed.

Figure 12:
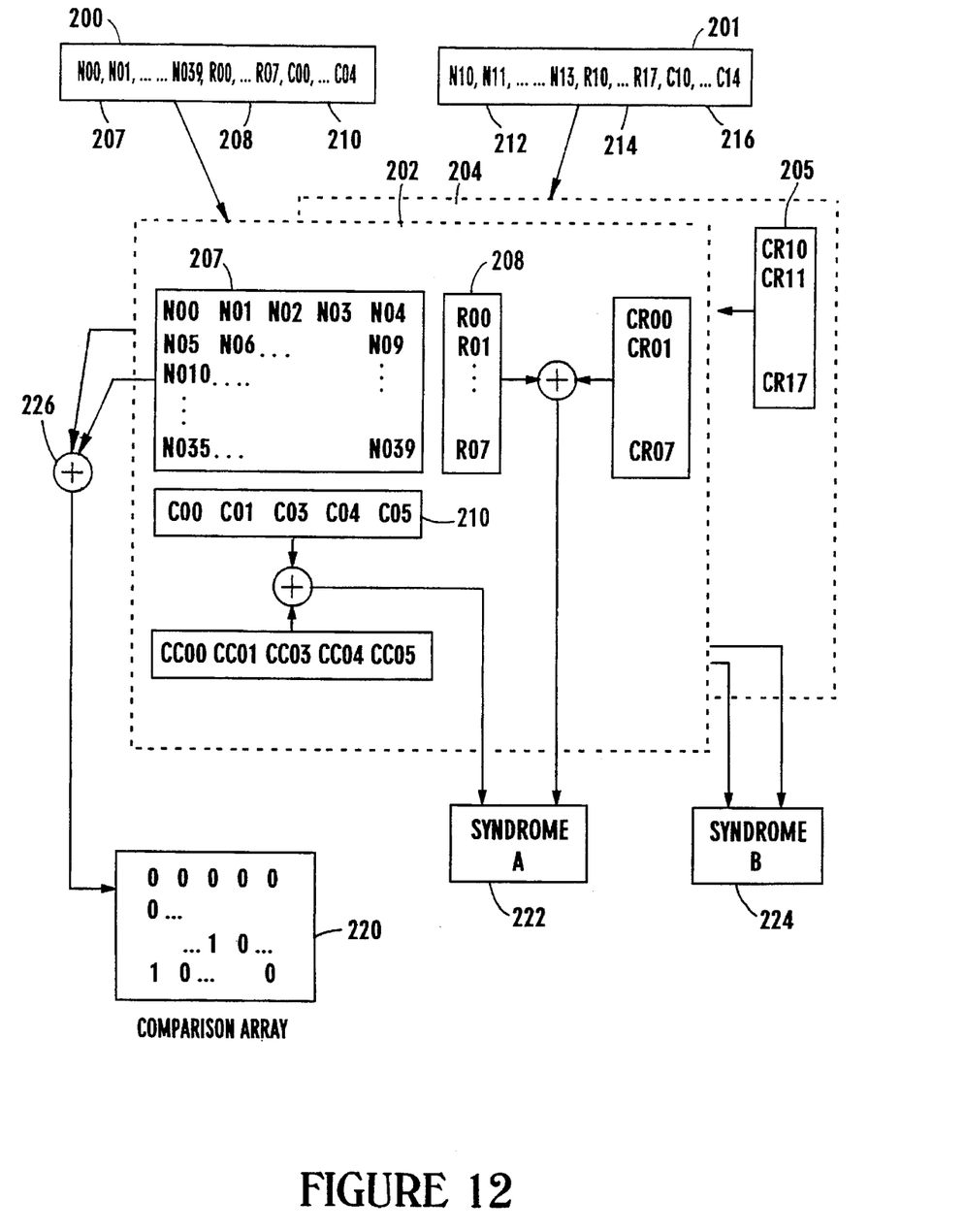
FIG. 12 shows a functional flow diagram of the ELC decoding process in a diversity system according to the present invention.

FIG. 12 is a functional block diagram of the ELC decoding process used in a diversity system such as the one shown in FIG. 11. Diversity blocks 200 and 201 represent the transmitted block as received at antenna 12 and at antenna 13, respectively. Diversity block 200 then undergoes ELC receive processing shown in block 202 thereby generating diversity syndrome 222. Diversity block 201 is also processed the same way as diversity block 200 as indicated by the block 204 which is partially shown in FIG. 12 thereby generating diversity syndrome 224.

In addition to these processing functions, i.e., generating the syndromes, the ELC process also generates the sample comparison array 220. Each sample in the sample array 207 and each sample in an array (not shown) formed from the samples received in diversity block 201 are compared so that a determination may be made as to whether the samples received in diversity block 200 match the samples received in diversity block 201. In a preferred embodiment, each sample (e.g., N0) is provided as an input to an exclusive-or operator 226 so that a "0" is output when the input samples match and a "1" is output when the input samples differ. Each output of the exclusive-or operator 226 is placed in the sample comparison array 220 in the row and column corresponding to the input samples' row and column in their respective sample arrays.

Figure 13:
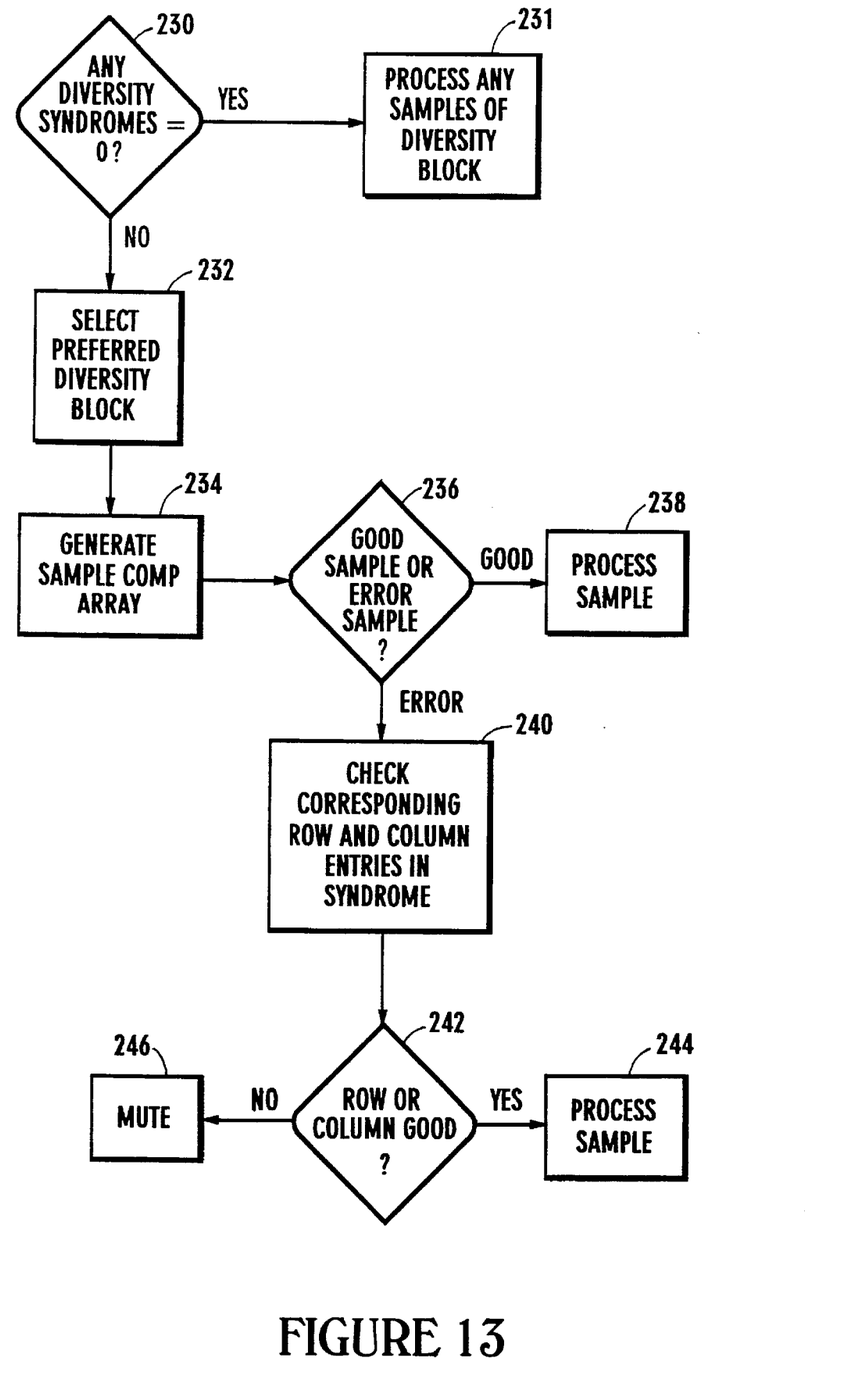
FIG. 13 shows a flow diagram of the ELC receive processing in a diversity system according to the present invention.

A flow diagram of the processing steps performed by the ELC selection logic processor is shown in FIG. 13. Preferably, each diversity syndrome is checked to determine if its corresponding syndrome contains errors at step 230. If at least one diversity syndrome is substantially error free, (i.e., its value is "0"), then all of the samples received in the corresponding diversity block are processed by the ADPCM decoder at step 231. If more than one diversity block are determined to be error-free, then the samples from any of these diversity blocks may be selected for ADPCM processing at step 231. However, if it is determined at step 230 that all of the diversity blocks contain at least one error, a preferred diversity block is selected at step 232.

The preferred diversity block is preferably selected by identifying which of the diversity blocks contains the fewest row and column checksum failures. If two or more diversity blocks contain the same number of row and column checksum failures, then one of these diversity blocks may be arbitrarily selected as the preferred diversity block.

A sample comparison array is then preferably generated at step 234 as described above. Each sample in this example, represented by a "0" in the sample comparison array is defined as a "good" sample at 236 and subsequently processed by the ADPCM decorder at step 238. Each sample represented by a "1" in the sample comparison array is defined as an "error" sample. The corresponding row and column entry from the preferred diversity block for each error sample may be checked at step 240. If either the row or column checksum corresponding to the error sample in the preferred diversity block is valid as determined at step 242, then the error sample is processed by the ADPCM decoder at 244. If both of the row and column checksums corresponding to the error sample in the preferred diversity block are failures, then that sample is muted at step 246.

Figure 14:
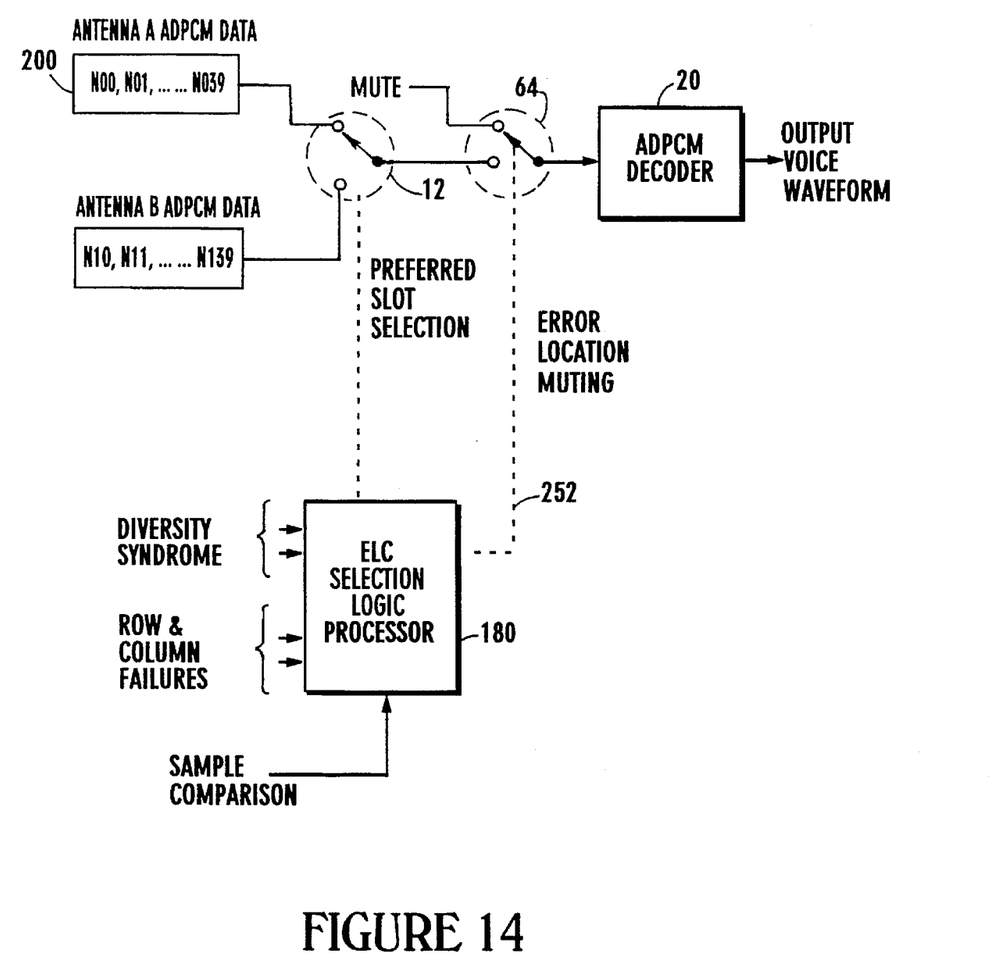
FIG. 14 shows a block diagram of the ELC control signal switching according to the present invention.

FIG. 14 is a simplified block diagram representing the switching control of the invention as used in the diversity system shown in FIG. 11. As shown in the figure, the diversity syndromes and the number of row and column failures are provided along with the sample comparison array as inputs to the ELC selection logic processor 180. The ELC selection logic processor 180 executes the processes and steps described above in conjunction with FIGS. 12 and 13 to generate control signal 250 and 252. Control signal 252 is used to toggle the switch 62 to select the samples received from diversity block 200 or 201. When at least one of the diversity syndromes indicates that samples received are substantially error free, control signal 252 causes switch 64 to remain set for sample processing until all of the samples received in the error-free diversity block have been input to the ADPCM decoder 20. When all of the diversity syndromes indicate that the samples received in their respective blocks contain at least one error, a preferred diversity slot 200 or 201 is selected based on the row and column failure inputs as described above. Control signal 250 preferably causes the switch 62 to couple the preferred diversity block to the ADPCM decoder 20 through switch 64. Control signal 252 may then toggle switch 64 to either mute the current sample output from the preferred diversity slot or provide the sample to the ADPCM decoder 20 for processing depending on the preferred diversity syndrome and the sample comparison array as explained above.

Other forms of diversity such as time diversity, frequency diversity, and code division diversity are also well known. It should be understood that any form of diversity may, therefore, be used to combat fading and interference. Additionally, diversity systems may contain any number of diversity channels, e.g. number of receive chains. Thus the term diversity block includes any block of data received in a particular diversity channel, regardless of whether space, time, frequency, code division, etc. diversity is used.

It should further be understood that the specific example of coding every two bits of a four bit sample has been used only for exemplary purposes. The coding and decoding techniques provided by the invention can likewise be used on samples having any number of bits which are reduced by any fraction during the coding process. For instance, the principles of the invention would apply similarly to samples having six bits where the six bits are reduced to three bit parity sets by dividing the six bits into three sets of two bits or reduced to two-bit parity sets by dividing the six bits of the sample into two sets of three bits.

While the invention has been described and illustrated with reference to specific embodiments, those skilled in the art will recognize that modification and variations may be made without departing from the principles of the invention as described hereinabove and set forth in the following claims.

What is claimed:

1. A method of coding digital data comprising the steps of:
   grouping a sequence of bits into a plurality of samples and forming the samples into a block of data;
   arranging the samples of the block into a number of rows and a number of columns to form a block array;
   reducing each sample into a parity bit set;
   processing the parity bit sets of each row and of each column of the block array to form a respective row vector and a respective column vector, a combination of the row and column vectors defining a parity vector; and
   combining the block of data with the parity vector to form a data transmission block.

2. The method of claim 1, wherein the digital data is indicative of voice data.

3. The method of claim 1, wherein the sequence of bits is generated by an adaptive differential pulse code modulation (ADPCM) algorithm.

4. The method of claim 1, wherein the step of reducing each sample into a parity bit set is carried out so that the parity bit set provides a predetermined parity characteristic.

5. The method of claim 1, wherein the step of reducing each sample into a parity bit set comprises:
   dividing each sample in groups of two bits; and
   defining a single parity bit for each of the two-bit groups of the sample, the parity bit being related to a value of each of the two bits.

6. The method of claim 1, the step of processing the parity bit sets comprises the step of:
   performing a checksum on the parity bit sets in each row and column of the block array, the parity vector comprising a sequence of checksum values, each checksum value being associated with one row or column of the block array.

7. The method of claim 1, wherein the data transmission block is sent to a receiving means, the receiving means decoding the data transmission block and utilizing the parity vector to locate any sample received with at least one bit error.

8. The method of claim 1, wherein the data transmission is sent to a receiving means being operable to provide diversity.

9. A method of improving the quality of a digital data transmission, comprising the steps:
   coding a block of data representing the digital data to be transmitted to form coded data;
   generating a first parity vector based upon the coded data;
   transmitting the block of data in combination with the first parity vector associated therewith;
   receiving the block of data and associated first parity vector;
   coding the block of data so received to form received coded data;
   generating a second parity vector based upon the received coded data;
   comparing the first and second parity vectors to identify data within the block of data that contains errors: and
   processing all of the data in the block of data so received that is not identified as containing errors and discarding the data identified as containing errors.

10. The method of claim 9, wherein the block of data comprises a sequence of samples, the method further comprising the step of:
    locating samples containing bit errors based on the comparison of the second parity vector and the associated parity vector.

11. The method of claim 9, wherein the block of data comprises a sequence of samples, the method further comprising the step of:
    providing a receiving means for receiving the transmitted block of data and associated first parity vector, the receiving means being operable to provide diversity so that each transmitted block of data is received in a plurality of diversity blocks;
    comparing the samples received in each of the plurality of diversity blocks to one another; and
    locating samples containing bit errors based on the comparison of the samples received in each of the plurality of diversity slots.

12. The method of claim 9, wherein the steps of coding the block of data transmitted and received comprise the steps of:
    dividing the block of data to be transmitted and the block of data so received into groups of data;
    arranging the groups of data into an array having a number of rows and a number of columns to from a respective transmission array and a respective reception array, each array having the same number of rows and the same number of columns; and
    coding each group of data according to a predetermined coding scheme.

13. The method of claim 12, wherein the groups of data are each coded to provide a predetermined parity characteristic.

14. The method of claim 12, wherein the steps of generating the parity vectors comprise the steps of:

performing a checksum on the groups of data in each of the rows and in each of the columns resulting in a checksum value associated with each row and each column; and combining all of the checksum values to form the parity vector.

15. The method of claim 12, further comprising the step of:

identifying those groups of data containing at least one error when the block of data so received is determined to contain at least one error.

16. The method of claim 9, wherein the digital data is received by a receiving means being operable to provide spatial diversity so that each transmitted block of data is received in a plurality of diversity blocks.

17. The method of claim 16, further comprising the steps of:

generating a plurality of second parity vectors based on the block of data received in each of the plurality of diversity blocks, each of the plurality of second parity vectors defining a new parity vector;

comparing each new parity vector with the associated first parity vector to determine whether the block of data so received in each respective diversity block contains errors and forming a syndrome based upon the comparison;

identifying one diversity block, if any, in which no errors are detected and then decoding the block of data associated with the diversity block so identified;

selecting a preferred diversity block when it is determined that the block of data received in substantially all of the diversity blocks contains at least one error; and processing the received block of data associated with the preferred diversity block.

18. The method of claim 17, wherein the preferred diversity block is based on the received coded data.

19. The method of claim 17, wherein each block of data transmitted comprises a plurality of samples and the samples are arranged in a number of rows and a number of columns, the parity vector comprising one checksum value related to each of the rows and columns, the method further comprising the steps of:

comparing the samples received in each of the diversity blocks on a sample-by-sample basis to determine whether each of the samples received in at least one of the plurality of diversity blocks is the same as the samples received in at least one other diversity block and defining those samples as good samples and, when the samples received in at least one of the plurality of diversity blocks differs from the samples received in the remaining diversity blocks, defining those samples as error samples;

processing the good samples received in any of the plurality of diversity blocks;

checking the syndrome of the preferred diversity block to determine whether errors were detected in the row and column associated with each error sample; and processing only those error samples for which either the associated row or column checksum value indicates that the respective row or column is error free.

20. A system for detecting and locating errors in digital voice data transmitted using a wireless communications system, wherein the digital voice data is grouped into a sequence of samples and a number of samples are transmitted as a block, the system comprising:

a receiving means having a spatial diversity capability for receiving the transmitted samples such that each block of samples is received in a plurality of diversity blocks each being based on a different transmission path;

a processing means coupled to the receiving means for processing the plurality of diversity blocks to detect on a sample by sample basis any sample likely to contain a data error based on predetermined criteria for every sample in the transmitted block without correcting the data error; and an ADPCM decoder interfaced with the processing means, the ADPCM decoder receiving an input of samples in which no errors have been detected from the processing means and processing those samples to reconstruct the voice data, said processing means including:

a plurality of receive processors coupled to the receiving means, each receive processor generating a syndrome form the transmitted samples so received; and a selection logic processor interfaced with each of the plurality of receive processors and the ADPCM decoder, the selection processor locating, based on the syndromes, samples so received that contain at least one error and preventing those samples so located from being further processed by the ADPCM decoder.

21. The system of claim 20, wherein the receiving means has a plurality of antennas for providing space diversity, the data errors being located through the use of spatial diversity.

22. The system of claim 20, further comprising:

a first switch coupled to the selection logic processor and having a plurality of contacts, each contact being associated with one of the diversity blocks and being interfaced with the receiving means to receive an output of the samples received in the associated diversity block, the selection logic processor selecting one of the diversity blocks based on the syndromes and closing the first switch at the contact associated with the diversity block so selected to provide an input of the samples received in the selected diversity block to the ADPCM decoder; and a second switch coupled to the selection logic processor and being interfaced between the first switch and the ADPCM decoder, the selection logic processor controlling the second switch so that the second switch opens the connection between the first switch and the ADPCM decoder for each sample so located thereby preventing the samples containing errors from being processed by the ADPCM decoder.

23. A method of decoding data received by a receiving unit of a wireless communication system, the data being transmitted in the form of a transmission block comprising a sequence of samples and at least one parity vector associated therewith, said parity vector being representative of a parity characteristic of the associated sequence of samples, the receiving means receiving each transmission block in a plurality of diversity blocks, the method comprising the steps of:

generating a new parity vector based on the sequence of samples received in each of the diversity blocks;

comparing the parity vector received in each of the diversity blocks with the new parity vector generated for each diversity block to form a diversity syndrome;

determining which samples so received contain errors based on the diversity syndromes;

muting those samples determined to contain errors; and decoding the remaining samples in the sequence of samples so received to reconstruct a waveform represented by the sequence of samples transmitted in the associated transmission block.

24. The method of claim 23, wherein the parity vector transmitted with the transmission block and new parity vectors so generated are formed by a coding process comprising the following steps:

arranging the sequence of samples into an array having a number of rows and a number of columns;

coding the samples according to a predetermined coding scheme to produce a coded data sample corresponding to each of the samples so coded;

generating a checksum value for each row and each column based on the coded data samples in the respective rows and columns; and forming a row vector of the checksum values generated from the respective rows of coded data samples and a column vector of checksum values generated from the respective columns of coded data samples, a combination of the row and column vector defining the new parity vector.

25. The method of claim 24, wherein the diversity syndromes are formed by combining the checksum values of the new parity vector with the checksum values of the parity vectors so received using an exclusive-or operator.

26. The method of claim 24, wherein the step of determining which samples so received contain errors comprises the steps of:

identifying a diversity block, if any, in which no errors were detected and then decoding the block of data associated with the diversity block so identified;

selecting a preferred diversity block for each transmission when the block of data received in substantially all of the diversity blocks is determined to contain at least one error;

comparing the samples received in each of the diversity blocks on a sample-by-sample basis to determine whether each of the samples received in at least one of the plurality of diversity blocks is the same as the samples received in at least one other diversity block and defining those samples which match as good samples and defining those samples which differ as error samples;

processing the good samples received in any of the plurality of diversity blocks;

checking the syndrome of the preferred diversity block to determine whether any errors were detected in the row and column associated with each error sample; and processing only those error samples for which either the associated row or column checksum value indicates that the respective row or column is error free.

* * * * *